(12) United States Patent
Naruse et al.

(10) Patent No.: US 9,708,502 B2
(45) Date of Patent: Jul. 18, 2017

(54) POWDER FOR 3D MODELING, SET FOR 3D MODELING, METHOD OF MANUFACTURING 3D OBJECT, AND DEVICE FOR MANUFACTURING 3D OBJECT

(71) Applicants: Mitsuru Naruse, Shizuoka (JP); Nozomu Tamoto, Shizuoka (JP); Yasuo Suzuki, Shizuoka (JP); Hitoshi Iwatsuki, Shizuoka (JP); Yasuyuki Yamashita, Shizuoka (JP); Kazumi Ohtaki, Shizuoka (JP)

(72) Inventors: Mitsuru Naruse, Shizuoka (JP); Nozomu Tamoto, Shizuoka (JP); Yasuo Suzuki, Shizuoka (JP); Hitoshi Iwatsuki, Shizuoka (JP); Yasuyuki Yamashita, Shizuoka (JP); Kazumi Ohtaki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 76 days.

(21) Appl. No.: 14/956,916

(22) Filed: Dec. 2, 2015

(65) Prior Publication Data

US 2016/0177122 A1 Jun. 23, 2016

(30) Foreign Application Priority Data

Dec. 18, 2014 (JP) .................................. 2014-256069

(51) Int. Cl.
*C09D 129/04* (2006.01)
*C08K 9/10* (2006.01)
(Continued)

(52) U.S. Cl.
CPC .......... *C09D 129/04* (2013.01); *B22F 1/0059* (2013.01); *B22F 3/008* (2013.01);
(Continued)

(58) Field of Classification Search
None
See application file for complete search history.

(56) References Cited

U.S. PATENT DOCUMENTS

2016/0040025 A1* 2/2016 Norikane ............ B29C 67/0081
106/157.2

FOREIGN PATENT DOCUMENTS

| JP | 2005-297325 | 10/2005 |
| WO | WO2004/073961 A2 | 9/2004 |
| WO | WO2015/046629 A1 | 4/2015 |

OTHER PUBLICATIONS

U.S. Appl. No. 14/816,370, filed Aug. 3, 2015.

* cited by examiner

*Primary Examiner* — Mary F Theisen
(74) *Attorney, Agent, or Firm* — Oblon, McClelland, Maier & Neustadt, L.L.P.

(57) ABSTRACT

A powder for 3D modeling includes a base particle and a resin having a functional group represented by the following Chemical formula 1,

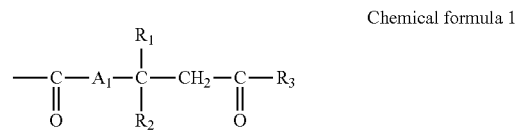

where $A_1$ represents O or NH and $R_1$, $R_2$, and $R_3$ each, independently represent $CH_3$, $C_2H_5$, $C_3H_7$, or $C_4H_9$. The base particle is covered with the resin.

11 Claims, 2 Drawing Sheets

(51) Int. Cl.
*B29C 67/00* (2017.01)
*B33Y 10/00* (2015.01)
*B33Y 30/00* (2015.01)
*B33Y 70/00* (2015.01)
*B22F 3/00* (2006.01)
*B22F 1/00* (2006.01)
*B22F 3/105* (2006.01)

(52) U.S. Cl.
CPC .......... *B29C 67/0081* (2013.01); *B33Y 10/00* (2014.12); *C08K 9/10* (2013.01); *B22F 2003/1056* (2013.01); *B33Y 30/00* (2014.12); *B33Y 70/00* (2014.12); *Y02P 10/295* (2015.11)

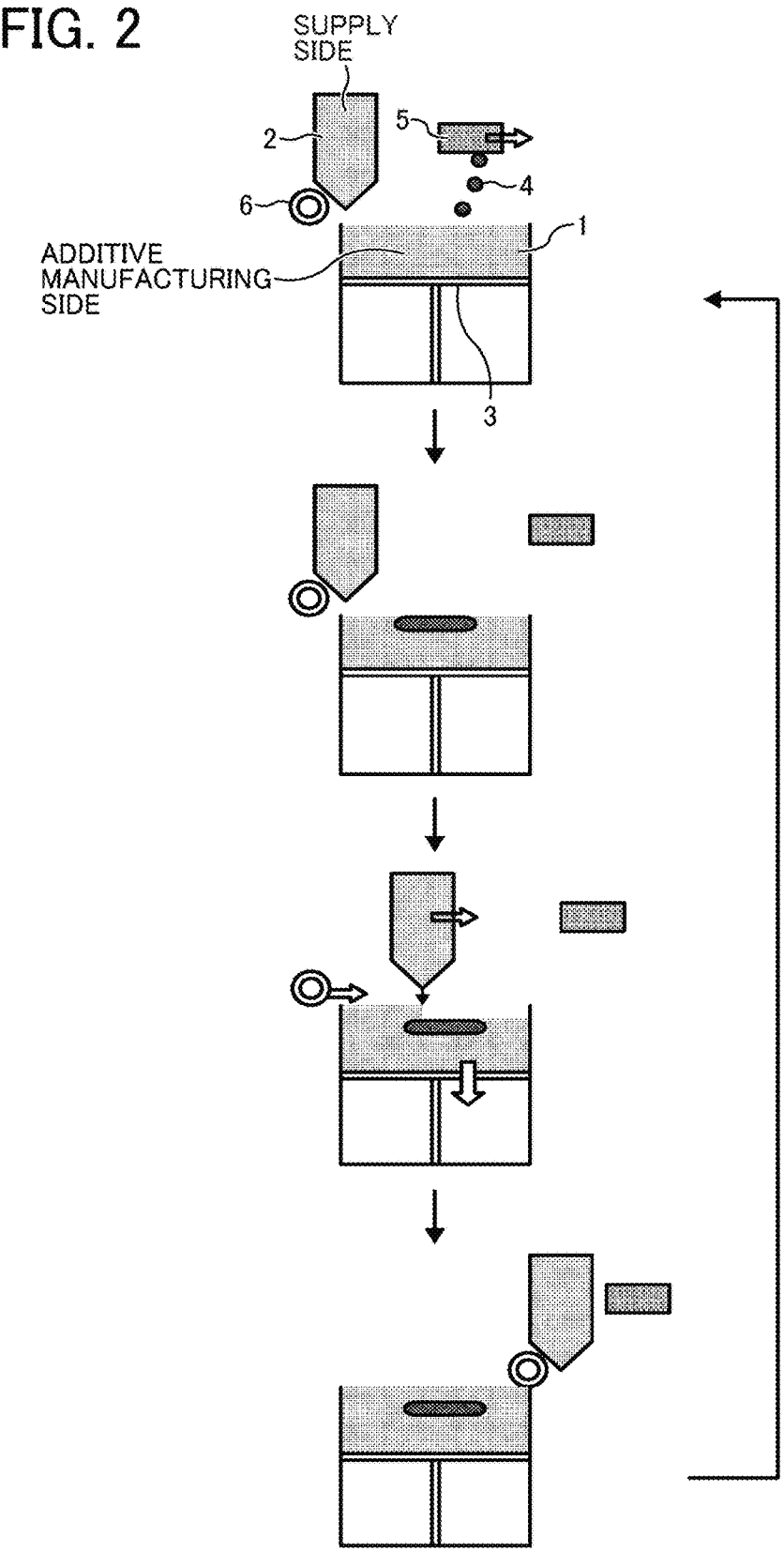

POWDER FOR 3D MODELING, SET FOR 3D MODELING, METHOD OF MANUFACTURING 3D OBJECT, AND DEVICE FOR MANUFACTURING 3D OBJECT

CROSS-REFERENCE TO RELATED APPLICATIONS

This patent application is based on and claims priority pursuant to 35 U.S.C. §119 to Japanese Patent Application No. 2014-256069 on Dec. 18, 2014 in the Japan Patent Office, the entire disclosure of which is hereby incorporated by reference herein.

BACKGROUND

Technical Field

The present invention relates to a powder for 3D modeling, a set for 3d modeling, a method of manufacturing a 3D object, and a device for manufacturing a 3D object.

Background Art

In place of a typical method of manufacturing a 3D object based on modeling die, a 3D modeling method is introduced, which is capable of manufacturing more complicated and finer 3D objects using a 3D printer. In particular, powder additive manufacturing methods are used in the case of a 3D object made of metal or inorganic compounds.

As one of the powder additive manufacturing methods, 3D objects are manufactured by laminating powder for 3D modeling of metal, an inorganic compound, etc., and imparting a solution that dissolves the powder to cause powder particles to adhere to each other in a predetermined pattern every single or multiple layers.

The 3D object manufactured by the powder additive manufacturing method is taken out of the laminated powder layers and optionally subject to post-processing such as sintering. Therefore, the object has to have strength to bear such processing.

SUMMARY

According to the present invention, provided is an improved powder for 3D modeling includes a base particle and a resin having a functional group represented by the following Chemical formula 1,

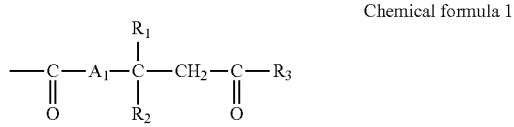

Chemical formula 1 where $A_1$ represents O or NH and $R_1$, $R_2$, and $R_3$ each, independently represent $CH_3$, $C_2H_5$, $C_3H_7$, or $C_4H_9$. The base particle is covered with the resin.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 2 is a schematic diagram illustrating another example of the additive manufacturing device (device for manufacturing a 3D object) according to another embodiment of the present invention.

DETAILED DESCRIPTION

Powder for 3D Modeling

Figure 1:
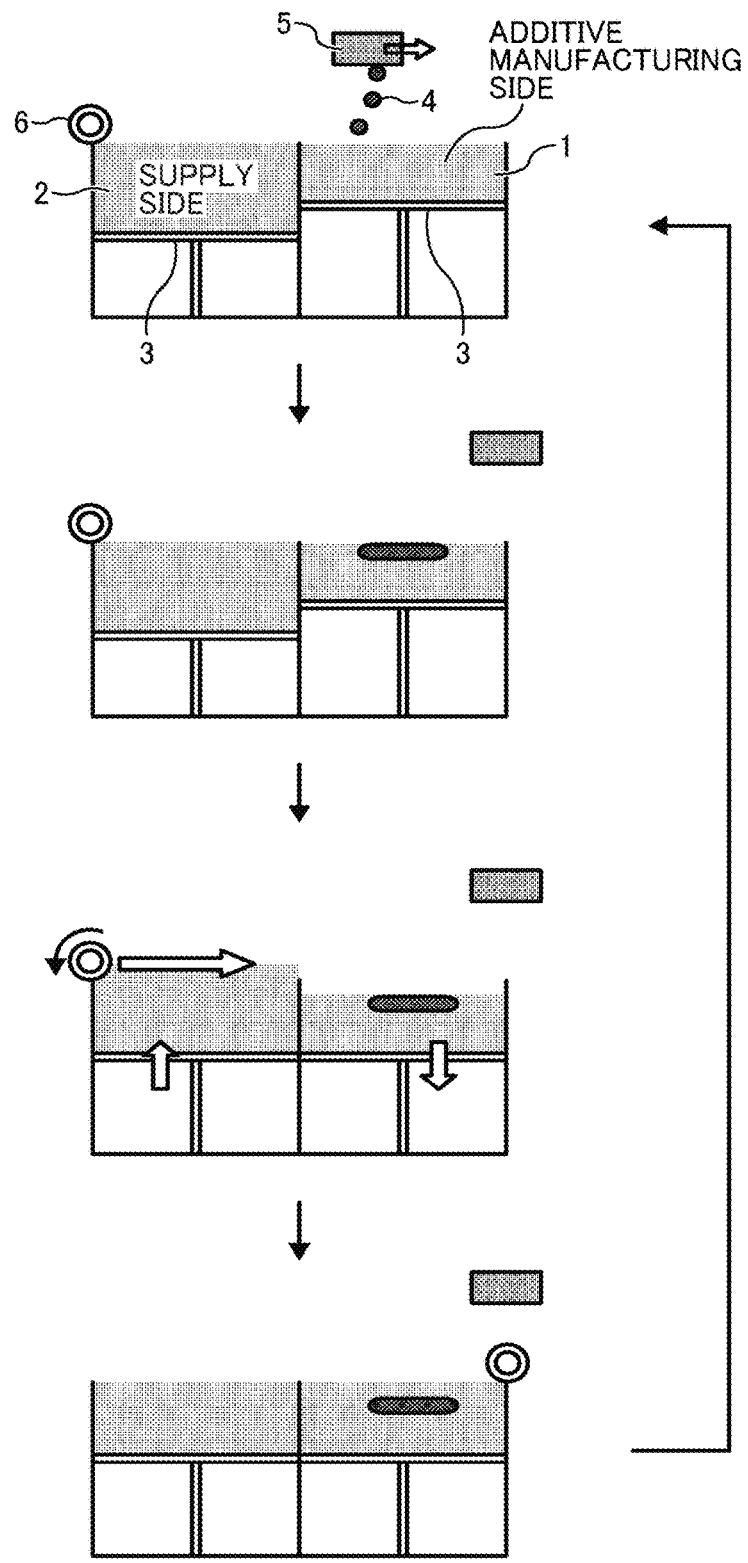
FIG. 1 is a schematic diagram illustrating an example of the additive manufacturing device (device for manufacturing a 3D object) according to an embodiment of the present invention.

The powder for 3D modeling of the present disclosure includes a base particle, a resin, and other optional components. The base particle is covered with the resin.

The resin has a functional group represented by the following Chemical formula 1.

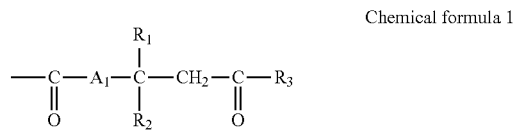

Chemical formula 1

In the Chemical formula 1, $A_1$ represents O or NH and $R_1$, $R_2$, and $R_3$ each, independently represent $CH_3$, $C_2H_5$, $C_3H_7$, or $C_4H_9$.

The resin is preferably polyvinyl alcohol (PVA) and more preferably diacetone acrylamide-modified polyvinylalcohol. 3D objects made of the powder for 3D modeling in which the base particle is covered with such a resin have markedly improved strength.

Non-modified (completely saponified) polyvinylalcohol used in typical powder for 3D modeling has a high level of crystallinity, so that the resin has a high level of hardness but its flexibility is poor. Therefore, a 3D object formed of such a resin is easily broken under bending stress.

To the contrary, the water soluble resin having the functional group represented by the Chemical formula 1, in particular, diacetone acrylamide-modified polyvinylalcohol to which a diacetone acrylamide group is introduced has a slightly lowered crystallinity and an improved flexibility with a higher level of hydrophilicity, thereby ameliorating the force of attachment to the surface of the base particle.

In addition, by setting the average polymerization degree of the resin within the range of from 500 to 1,700, the manufactured 3D object has an improved strength.

Moreover, it is more preferable to use diacetone acrylamide-modified polyvinylalcohol having an average polymerization degree as the resin because it further improves the strength of the manufactured 3D object.

Furthermore, the diacetone acrylamide group in the diacetone acrylamide-modified polyvinylalcohol reacts with a cross-linking agent. Therefore, if a cross-linking agent is used in the solution, cross-linking are made between the resins, thereby further improving the strength of the resin itself As described above, the 3D object manufactured by using the powder for 3D modeling described above has markedly improved strength in comparison with a typically manufactured 3D object.

Base Particle

Examples of materials of the base particle are metal, ceramic, carbon, polymers, wood, and biocompatible materials. Of these, metal and ceramic bearable to sintering are preferable in terms of manufacturing a 3D object having a high level of strength.

Specific examples of the metal include, but are not limited to, stainless steel (SUS), iron, copper, titanium, and silver. Of these, stainless steel (SUS) is preferable. A specific example of the stainless steel (SUS) is SUS316L.

Specific examples of the ceramic include, but are not limited to, metal oxides such as silica ($SiO_2$), alumina ($Al_2O_3$), zirconia ($ZrO_2$), and titania ($TiO_2$).

Specific examples of the carbon include, but are not limited to, graphite, graphen, carbon nanotube, carbon nanohom, and fullerene.

Examples of the polymer are known resins insoluble in water.

Specific examples of the wood include, but are not limited to, wood chip and cellulose.

Specific examples of the biocompatible materials include, but are not limited to, polylactic acid and calcium phosphate.

These materials can be used alone or in combination.

It is possible to use products available on market formed of these materials as the base particle. Specific examples of such products include, but are not limited to, SUS316L (PSS316L, manufactured by Sanyo Special Steel Co., Ltd.), $SiO_2$ (EXCELICA SE-15K, manufactured by Tokuyama Corporation), $AlO_2$ (TAIMICRON TM-5D, manufactured by TAIMEI CHEMICALS Co., Ltd.), and $ZrO_2$ (TZ-B53, manufactured by TOSOH CORPORATION).

The base particle may be subject to known surface reforming treatment in order to improve affinity with the resin.

The volume average particle diameter of the base particle is not particularly limited. The volume average particle diameter is preferably from 0.1 μm to 500 μm, more preferably from 5 μm to 300 μm, and furthermore preferably from 15 μm to 250 μm.

When the volume average particle diameter is in the range of from 0.1 μm to 500 μm, the manufacturing efficiency of 3D objects is excellent and handling property is also good. If a thin layer is formed by using the powder for 3D modeling described above when the volume average particle diameter is 500 μm or less, the filling rate of the powder for 3D modeling in the thin layer is improved, meaning that voids, etc. do not easily occur in the thus-obtained 3D object.

The volume average particle diameter of the base particle can be measured according to known methods using a known particle diameter measuring instrument such as Microtrac HRA (manufactured by NIKKISO CO., LTD.).

The particle size distribution of the base particle is not particularly limited and can be suitably selected to a particular application.

The shape, surface area, circularity, fluidity, wettability, etc. of the base particle are suitably selected to a particular application.

Resin

The resin contained in the powder of the present disclosure has the functional group represented by the following Chemical formula 1 and the base particle is covered with the resin.

Chemical formula 1

$$-\underset{O}{\overset{\parallel}{C}}-A_1-\underset{R_2}{\overset{R_1}{\underset{|}{C}}}-CH_2-\underset{O}{\overset{\parallel}{C}}-R_3$$

In the Chemical formula 1, $A_1$ represents O or NH, and $R_1$, $R_2$, and $R_3$ each, independently represent $CH_3$, $C_2H_5$, $C_3H_7$, or $C_4H_9$.

Of these, in terms of the strength of manufactured 3D objects, $A_1$ is preferably NH and $R_1$, $R_2$, and $R_3$ are preferably $CH_3$.

The resin having the functional group represented by the Chemical formula 1 is dissolved in a solution described later.

In the present disclosure, the dissolution property of the resin means that, for example, when 1 g of the resin described above is mixed and stirred in 100 g of a solvent constituting a solution at 30 degrees C., 90 percent by mass or more of the resin is dissolved therein.

The average polymerization degree of the resin having the functional group represented by the Chemical formula 1 is preferably from 300 to 2,000 and more preferably from 500 to 1,700 in terms of the strength of a 3D object.

In the range of the average polymerization degree from 300 to 2,000, the strength of a 3D object is enhanced.

The resin having the functional group represented by the Chemical formula 1 is not particularly limited. It can be synthesized by a known method. For example, a monomer having the functional group represented by the Chemical formula 1 and other optional monomers are caused to be dissolved in a solvent and polymerized under the presence of a polymerization initiator in a nitrogen atmosphere followed by optional treatment such as saponification.

Specific examples of the monomer having the functional group represented by the Chemical formula 1 include, but are not limited to, diacetone acrylamide, diacetone methacrylamid, diacetone acrylate, and diacetone methacrylate. Of these, diacetone acrylamide is preferable in terms of improvement degree of the strength of a 3D object.

The resin is preferably a water soluble resin having the functional group represented by the Chemical formula 1, more preferably polyvinylalcohol having the functional group represented by the Chemical formula 1, and particularly preferably diacetone acrylamide-modified polyvinylalcohol.

The diacetone acrylamide-modified polyvinylalcohol is a water soluble resin having the structure represented by the following Chemical formula 2.

Chemical formula 2

$$-\left(CH_2-\underset{\underset{NH}{\underset{|}{\underset{C=O}{|}}}}{\overset{|}{CH}}\right)_x\left(CH_2-\underset{OH}{\overset{|}{CH}}\right)_y\left(CH_2-\underset{\underset{CH_3}{\underset{|}{\underset{C=O}{|}}}}{\overset{|}{CH}}\right)_z$$

$$CH_3-\underset{\underset{C=O}{\underset{|}{\underset{CH_2}{|}}}}{\overset{|}{\underset{|}{C}}}-CH_3$$

$$CH_3$$

In the Chemical formula 2, x is preferably from 1 mol percent to 15 mol percent and more preferably from 2 mol percent to 10 mol percent. y is preferably from 85 mol percent to 99 mol percent. z is preferably from 0 mol percent to 24 mol percent.

The diacetone acrylamide-modified polyvinylalcohol is available on market. Specific examples thereof include, but are not limited to, D-PVA series (manufactured by JAPAN VAM & POVAL CO., LTD.), e.g., DF-03 (average polymerization degree: 300), DF-05 (average polymerization degree: 500), DF-17 (average polymerization degree: 1,700), and DF-20 (average polymerization degree: 2,000).

A specific example of the resin having the functional group represented by the Chemical formula 1 other than the diacetone acrylamide-modified polyvinylalcohol is a copolymer of diacetone acrylamide-acrylic. The copolymer of diacetone acrylamide-acrylic is available on market and specific examples thereof include, but are not limited to, Plascize L-9504B and Plascize L-6466 (both manufactured by GOO CHEMICAL CO., LTD.).

Known resins other than the resin having the functional group represented by the Chemical formula 1 may be optionally used unless it damages the effect of the present disclosure.

The resin particulate preferably has an average coverage thickness of from 5 nm to 500 nm, more preferably from 50 nm to 300 nm, and furthermore preferably from 100 nm to 200 nm.

When the coverage thickness is in the range of from 5 nm to 500 nm, the strength of a manufactured 3D object and the dimension accuracy during sintering are improved.

The coverage thickness can be obtained by, for example, embedding the powder for 3D modeling in an acrylic resin, etc., exposing the surface of the base particle by etching, etc., and thereafter measuring the thickness with a scanning tunneling microscope (STM), an atomic force microscope (AFM), or a scanning electron microscope (SEM).

Specifically, a sample for observation is prepared by polishing the surface of the powder for 3D modeling by emery paper and thereafter slightly polishing the surface with a wet cloth to dissolve the resin portion. Next, the border between the base portion and the resin portion exposed to the surface is observed by a field-emission-type scanning electron microscope (FE-SEM) and the length between the surface of the resin portion and the border is measured as the coverage thickness. Thereafter, the average of the ten measured points is obtained as the coverage thickness (average thickness).

The coverage ratio (area ratio) of the surface of the base particle is not particularly limited and can be suitably selected to a particular application. For example, it is preferably 15 percent or more, more preferably 50 percent or more, and particularly preferably 80 percent or more. The higher the coverage ratio is, the stronger a 3D object becomes.

The coverage ratio is obtained by, for example, observing a photograph of the powder for 3D modeling and calculating the average of the area ratio (percent) of the portion covered with the resin to all the area of the surface of the base particle about the powder for 3D modeling in the two-dimensional photograph.

Other Components

The other optional components are not particularly limited and can be selected to a suitable application. Examples thereof are a fluidizer, a filler, a leveling agent, a sintering agent, and a surfactant.

It is preferable that the powder for 3D modeling contains a fluidizer because layers of the powder for 3D modeling are easily and efficiently formed. It is preferable that the powder for 3D modeling contains a filler because voids etc. do not easily appear in an obtained cured object (3D object, cured object for sintering). It is preferable that the powder for 3D modeling contains a leveling agent because the wettability of the powder for 3D modeling ameliorates, thereby improving handling property, etc. It is preferable that the powder for 3D modeling contains a sintering agent because it is possible to sinter an obtained cured object (3D object, cured object for sintering) at lower temperatures.

Method of Covering with Resin

The powder for 3D modeling of the present disclosure is obtained by covering the surface of the base particle with a resin.

The method of covering the base particle with a resin is not particularly limited. The base particle can be covered by a known method. For example, a tumbling fluidizing coating method, a spray drying method, a stirring mixing addition method, a tipping method, a kneader coating method, etc. are suitable. Of these, a tumbling fluidizing coating method is preferable because the coverage layer is beautifully coated.

Property of Powder for 3D Modeling

The volume average particle diameter of the powder for 3D modeling is not particularly limited and can be suitably determined to a particular application. The volume average particle diameter is preferably from 3 µm to 200 µm, more preferably from 5 µm to 150 µm, and particularly preferably from 10 µm to 85 µm.

When the volume average particle diameter is 3 µm or greater, the fluidity of the powder is improved, the powder layer is easily formed, so that the smoothness of the surface of the laminated layers ameliorates. As a consequence, the manufacturing efficiency and handling property, and dimension accuracy of the 3D object tend to be better. In addition, when the volume average particle diameter is 250 µm or less, the space between the powder particles is reduced, thereby decreasing the void ratio of a thus-obtained 3D object, which contributes to enhancement of the strength thereof. Accordingly, the volume average particle diameter is preferably from 3 µm to 250 µm to strike a balance between the dimension accuracy and the strength.

The volume average particle diameter of the base particle can be measured by a known particle size measuring device, such as Microtrac HRA (manufactured by NIKKISO CO., LTD.) according to a known method.

The particle size distribution of the powder for 3D modeling is not particularly limited and can be suitably determined to a particular application.

The powder for 3D modeling of the present disclosure can be applied to simple and efficient manufacturing of various modeled objects and structures and also particularly suitably applied to the set for 3D modeling, the method of manufacturing a 3D object, and the device for manufacturing a 3D object of the present disclosure described later.

Set for 3D Modeling

The set for 3D modeling of the present disclosure contains the powder for 3D modeling of the present disclosure, a solution that contains a solvent to dissolve the resin with which the base particle is covered, and other optional components.

Solution

The solution contains the solvent to dissolve the resin with which the base particle is covered, preferably a cross-linking agent, and other optional components.

Solvent

The solvent is not particularly limited. Preferably, it dissolves the resin with which the base particle is covered.

Specific examples of the solvent include, but are not limited to, water, alcohols such as ethanol, aqueous medium such as ether and ketone, aliphatic hydrocarbons, ether-based solvents such as glycol ether, ester-based solvents such as ethyl acetate, ketone-based solvents such as methylethylketone, and higher alcohols. Of these, water is preferable.

As the water, deionized water, ultrafiltered water, reverse osmosis water, distilled water, pure water, and ultra pure water can be used.

If water is used as the solvent of the solution, thickening of the solvent is avoided when the solvent dries, which is preferable in terms that defective discharging does not occur even when it is applied to an inkjet method.

Cross-Linking Agent

By imparting the solvent to the powder for 3D modeling, the resin in the powder for 3D modeling is dissolved in the solvent in the solution. Therefore, the base particles adhere to each other as water as the solvent dries, so that a 3D object is formed. During forming of the object, if the solution contains a cross-linking agent, a cross-linking structure is formed with the resin, thereby further improving the strength of the obtained 3D object.

The cross-linking agent is not particularly limited. Preferably, it conducts cross-linking reaction with the functional group represented by the Chemical formula 1. For example, zirconia-based cross-linking agents, titanium-based cross-linking agents, water-soluble organic cross-linking agents, chelating agents, and dihydrazide compounds are suitable.

Specific examples of the zirconia-based cross-linking agents include, but are not limited to, zirconium chloride and ammonium zirconium carbonate.

Specific examples of the titanium-based cross-linking agents include, but are not limited to, titanium acylate and titanium alkoxide.

Specific examples of the water soluble organic cross-linking agents include, but are not limited to, compounds including a carbodiimide group and bisvinylsulfonic compounds.

Specific examples of the chelating agents include, but are not limited to, organic titanium chelate and organic zirconium chelate.

A specific example of the dihydrazide compounds is adipic acid dihydrazide.

These can be used alone or in combination. Of these, ammonium zirconium carbonate is preferable.

The content (concentration) of the cross-linking agent is not particularly limited and can be suitably determined to a particular application. The concentration of from 0.1 parts by mass (percent by mass) to 50 parts by mass (percent by mass) to 100 parts by mass of the resin is preferable. The concentration of from 0.5 part by mass (percent by mass) to 40 parts by mass (percent by mass) to 100 parts by mass of the resin is more preferable. The concentration of from 1 part by mass (percent by mass) to 35 parts by mass (percent by mass) to 100 parts by mass of the resin is particularly preferable.

Other Components

Examples of the other optional components are fluidity adjusters, surfactants, preservatives, antiseptic agents, stabilizing agents, pH regulators, water soluble solvents, and wetting agents.

Since the solution in the set for 3D modeling of the present disclosure has a high level of safety, the set can be suitably used for various objects and structures having sufficient strength. The set can be particularly suitably applied to the method of manufacturing a 3D object and the device for manufacturing a 3D object described later and the 3D object obtained in the present disclosure.

3D (Three-Dimensional) Object

The 3D object (three-dimensional object) obtained in the present disclosure is a cured object obtained by imparting the solution to the powder for 3D modeling of the present disclosure or a cured object obtained by imparting the solution to the powder for 3D modeling in the set for 3D modeling of the present disclosure and is used as a cured object for sintering to manufacture an object (sintered structure of the 3D object) by sintering.

The 3D object is obtained by simply imparting the solution to the powder for 3D modeling but has a sufficient strength. In the 3D object, the base particles are densely (high filling rate) present and a very minute amount of the resin is present around the base particles. Therefore, when a sintered object is obtained after sintering, unlike a typical cured object of powder or particle obtained by using an adhesive, unnecessary voids (marks of removed grease), etc. are not present since the amount of volatile organic component (removal of grease) is reduced. As a consequence, the sintered object has a beautiful appearance.

The strength of the 3D object is, for example, such that no structural damage is caused by abrading the surface and no cracking occurs when the object is subject to air blow treatment at 5 cm away using an air gun having a nozzle diameter of 2 mm and an air pressure of 0.3 MPa.

Method of Manufacturing 3D Object and Device for Manufacturing 3D Object

The method of manufacturing a 3D object of the present disclosure includes powder layer forming, powder layer curing, and other optional step such as sintering.

The 3D object is manufactured by repeating the steps of the powder layer forming and the powder layer curing.

The device for manufacturing a 3D object of the present disclosure includes a powder layer forming device and a solution imparting device. Preferably, it has a powder containing unit and a solution containing unit with other optional device such as a solution supplier and a sintering device.

Powder Layer Forming Step and Powder Layer Forming Device

The powder layer forming step forms a powder layer for 3D modeling on a substrate by using the powder for 3D modeling of the present disclosure.

The powder layer forming device forms a layer of the powder for 3D modeling of the present disclosure on a substrate.

Substrate

The substrate is not particularly limited. Preferably, it can place the powder for 3D modeling thereon. For example, a known platform or base plate having a surface on which the powder for 3D modeling is placed is suitably used.

The surface of the substrate, that is, the surface on which the powder for 3D modeling powder is placed can be smooth, coarse, plane, or curved plane. It is preferable that the surface has a low affinity with the resin when the resin is dissolved.

If the affinity of the surface with the dissolved resin is lower than that of the base particle with the dissolved resin, it is easy to take the obtained 3D object out of the surface.

Forming Powder Layer

The method of placing the powder for 3D modeling on the substrate is not particularly limited. For example, a method using a known counter rotation mechanism (counter roller) for use in a selective laser sintering method, a method of extending the powder for 3D modeling to a thin layer using a member such as a brush, a roller, and a blade, a method of extending the powder for 3D modeling to a thin layer by pressing the surface of the powder for 3D modeling using a pressure member, and a method of using a known powder additive manufacturing device (device for manufacturing a 3D object) are suitable as the method of placing the powder for 3D modeling in a thin layer.

Using the counter rotation mechanism (counter roller), the brush, the blade, or the pressing member, a thin layer of the powder for 3D modeling can be formed on a substrate, for example, in the following manner:

In the outer frame (also referred to as "form", "hollow cylinder" "tubular structure", etc.), the powder for 3D modeling is placed by the counter rotation mechanism (counter roller), the brush, the blade, the pressing member, etc. onto the substrate arranged to move up and down slidably along the inside wall of the outer frame. At this point, if the substrate is movable up and down in the outer frame, it is arranged slightly lower than the upper open mouth of the outer frame. That is, while placing the substrate with a layer thickness of the powder for 3D modeling below the open mouth, the powder for 3D modeling is placed on the substrate. A thin layer of the powder material for additive manufacturing is thus-placed on the substrate.

By imparting the solution to the thin layer of the powder for 3D modeling placed on the substrate, the resin with which the base particle in the powder for 3D modeling is covered is dissolved in the solvent in the solution. Therefore, the base particles adhere to each other as water serving as the solvent dries. Consequently, the thin layer is cured (the step of curing the powder layer described above).

The powder for 3D modeling is placed on the thin layer of the thus-obtained cured object in the same manner as described above and thereafter, when the solution is imparted to the powder layer formed on the thin layer, the resin with which the base particle is covered is dissolved and cured. The curing at this point of time occurs not only to the powder layer formed on the thin layer but also to the border between the powder layer and the thin layer (cured object) that is already cured and present below the powder layer. As a consequence, the cured object (additive manufactured object) is obtained which has a thickness corresponding to about the two layers of the powder (layer) for additive manufacturing placed on the thin layer.

In addition, it is possible to automatically and simply place a thin layer of the powder for 3D modeling on the substrate by using the known additive manufacturing device (device for manufacturing a 3D object) described above. A typical powder additive manufacturing device has a recoater to laminate the powder for 3D modeling, a movable supplying tank to supply the powder for 3D modeling onto the substrate, and a movable modeling tank to form a thin layer of the powder for 3D modeling and laminate the thin layers. In the powder additive manufacturing device, the surface of the supplying tank can be elevated slightly above the surface of the modeling tank by moving up the supplying tank, moving down the modeling tank, or both. In addition, the powder for 3D modeling is arranged to form a thin layer using the recoater from the side of the supplying tank and by repeating moving the recoater, the thin layers of the powder for 3D modeling are laminated.

The thickness of the powder layer for additive manufacturing is not particularly limited. For example, the average thickness for a single layer is preferably from 30 μm to 500 μm and more preferably from 60 μm to 300 μm.

When the thickness is 30 μm or greater, the strength of the cured object (3D object) of the powder (layer) for additive manufacturing formed by imparting the solution to the powder for 3D modeling is sufficient, which makes it free from problems such as losing shape during processing such as sintering conducted after forming the layer. When the thickness is 500 μm or below, the dimension accuracy of the cured object (3D object) of the powder (layer) for additive manufacturing formed by imparting the solution to the powder for 3D modeling is improved.

Incidentally, the average thickness can be measured according to a known method.

Powder Layer Curing Step and Solution Imparting Device

The powder layer curing step includes imparting a solution containing a solvent that dissolves the resin to an area of the powder layer for 3D modeling formed in the step of forming the powder layer to cure the area.

The solution imparting device imparts a solution containing a solvent that dissolves the resin with which the base particle is covered to cure the area of the powder layer for 3D modeling formed by the powder layer forming device.

The method of imparting the solution to the powder layer is not particularly limited. For example, a dispenser method, a spray method, or an inkjet method is suitably selected to a particular application. To execute such a method, a known device is suitably used as the solution imparting device.

Of these, the dispenser method has an excellent quantitative property but the application area is small. The spray method is capable of simply forming a fine discharging material and has a wide application area but the quantitative property thereof is poor so that powder scatters due to the spray stream. For this reason, in the present disclosure, the inkjet method is particularly preferable. The inkjet method has a good quantitative property in comparison with the spray method and a wider application area in comparison with the dispenser method. Accordingly, the inkjet method is preferable to accurately and efficiently form a complicated shape.

When utilizing the inkjet method, the solution imparting device has a nozzle to impart the solution to the powder layer by the inkjet method. As the nozzle, nozzles (discharging head) in the known inkjet printers can be suitably used. In addition, it is possible to use the inkjet printer as the solution imparting device. A specific example of the inkjet printer is SG7100, manufactured by Ricoh Company Ltd. It is preferable to use the inkjet printer because the head portion can drip a large amount of the solution at once and the application area is large, which leads to improvement of high application performance.

In the present disclosure, even when an inkjet printer is used to accurately and efficiently impart the solution, the nozzles and the head of the nozzles are free of clogging or corrosion since the solution contains no solid material such as particles or highly viscous polymer such as a resin. In addition, when the solution is imparted onto the powder layer for 3D modeling, it efficiently permeates into the resin in the powder for 3D modeling. Accordingly, the efficiency of manufacturing a 3D object is excellent and an unexpected volume increase can be avoided since polymer components such as resins are not imparted. Consequently, a cured object having a good dimension accuracy can be easily and efficiently obtained in a short time.

The cross-linking agent can also serve as a pH regulator in the solution. When the solution is imparted to the powder layer for 3D modeling according to the inkjet method, the pH of the solution is preferably from 5 (weak acidity) to 12 (basic) and more preferably from 8 to 10 (weak basic) in terms of prevention of clogging and corrosion of nozzle head portions of nozzles to be used. To regulate the pH, known pH regulators can be used.

Powder Containing Unit

The powder containing unit contains the powder for 3D modeling. The size, forms, materials, etc. thereof are not particularly limited. For example, a storage tank, a bag, a cartridge, or a tank is suitably selected to a particular application.

Solution Containing Unit

The solution containing unit contains the solution. The size, form, material, etc. thereof are not particularly limited. For example, a storage tank, a bag, a cartridge, or a tank is suitably selected to a particular application.

Other Process and Other Device

The other processes include a drying process, a sintering process, a surface protection treatment process, a coating (application) process, etc.

The other devices include a dryer, a sintering device, a surface protection treatment device, a coating device (applicator), etc.

The drying process is to dry a cured object (3D object) obtained in the powder layer curing process. In the drying process, not only water contained in the cured object but also organic materials may be removed (degreasing). For example, known driers can be used as the drier.

The sintering process is to sinter a cured object (3D object) obtained in the powder layer curing process. According to this sintering process, the cured object is made as an integrated object (sintered object of the 3D modeling) of metal or ceramic. For example, a known sintering furnace can be used as the sintering device.

The surface protection treatment process is to form a protection layer on a cured object (3D object) formed in the powder layer curing process. By executing the surface protection treatment process, durability is imparted to the surface of the cured object (3D object) to the degree that, for example, the object can be used as is. Specific examples of the protection layer include, but are not limited to, a water-resistant layer, a weather resistant layer, a light resistant layer, a heat insulation layer, and a gloss layer. Specific examples of the surface protection treatment device include, but are not limited to, known surface protection treatment devices such as a spraying device and a coating device.

The coating process is to coat a cured object (3D object) formed in the powder layer curing step. According to this coating process, the cured object (3D object) is colored in a desired color. Specific examples of the coating device include, but are not limited to, known coating devices using a spray, a roller, a brush.

FIG. 1 is a diagram illustrating an example of the device for manufacturing a 3D object of the present disclosure. The powder layer forming device illustrated in FIG. 1 includes a powder storage tank 1 on the additive manufacturing (3D modeling) side and a powder storage tank 2 on the powder supplying side. Each of these powder storage tanks has a stage 3 movable up and down and places the powder for 3D modeling on the stage 3 to form a thin layer formed of the powder.

The powder layer forming device has an inkjet head 5 over the storage tank 1 to discharge a solution 4 toward the powder for 3D modeling in the powder storage tank 1. Moreover, it supplies the powder for 3D modeling from the powder storage tank 2 to the powder storage tank 1 and also has a recoating mechanism (hereinafter referred to as recoater) 6 to smooth the surface of the powder (layer) for 3D modeling in the powder storage tank 1.

The solution 4 is dripped from the inkjet head 5 onto the powder layer for 3D modeling of the powder storage tank 1. At this point in time, the position where the solution 4 is dripped is determined by two-dimensional image data (slice data) obtained by slicing a desired 3D shape into multiple plane layers.

After completing depiction of one of the layers, the stage 3 in the powder storage tank 2 is elevated while the stage 3 in the storage tank 1 is lowered. The amount of the powder for 3D modeling corresponding to the difference is moved to the powder storage tank 1 by the recoater 6.

This is how a new layer of the powder for 3D modeling is formed on the surface of the depicted powder layer for 3D modeling. The single layer of the powder for 3D modeling has a thickness of from about several tens µm to about several hundreds µm.

Furthermore, depiction is conducted on the newly-formed powder layer for 3D modeling based on slice data for the second layer (new layer). A series of these processes are repeated to obtain a 3D object. Subsequent to heating and drying by a heater, a final 3D object is obtained.

FIG. 2 is a diagram illustrating another example of the additive manufacturing device of the present disclosure. The powder layer forming device illustrated in FIG. 2 is the same in principle as that illustrated in FIG. 1 except that the supply mechanism is different. That is, the powder storage tank 2 on the supply side is provided over the powder storage tank 1. When the depiction of the first layer is finished, the stage 3 of the powder storage tank 1 is lowered in a predetermined amount and the powder for 3D modeling is dropped from the powder storage tank 2 to the powder storage tank 1 while moving the powder storage tank 2 to form a new powder layer for 3D modeling. Thereafter, the recoater 6 compresses the powder layer for 3D modeling to increase the bulk density and also smooth the height of the powder layer for additive manufacturing.

By the powder layer forming device illustrated in FIG. 2, the configuration of the device is compact in comparison with the configuration illustrated in FIG. 1 in which the two powder storage tanks are arranged side by side.

According to the method of manufacturing a 3D object and the device for manufacturing a 3D object of the present disclosure, a 3D object having a complicated form and a sufficient strength with a high level of safety and good dimension accuracy can be simply and efficiently manufactured without losing shape before sintering, etc., by using the powder for 3D modeling of the present disclosure or the set for 3D modeling of the present disclosure.

Since the thus-obtained 3D object has a sufficient strength and excellent dimension accuracy while representing fine roughness and curved planes, the object has aesthetic aspect with high quality and can be suitably used for various purposes.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Example 1

Manufacturing of Powder 1 for 3D Modeling

Preparation of Coating Liquid 1

114 parts by mass of deionized water was mixed with 6 parts of diacetone acrylamide-modified polyvinylalcohol (DF-03, average polymerization degree: 300, manufactured by JAPAN VAM & POVAL CO., LTD.). The mixture was stirred for one hour using a general purpose agitator BL600 (manufactured by SHINTO Scientific Co., Ltd.) while being heated at 80 degrees C. in a water bath to dissolve diacetone acrylamide-modified polyvinylalcohol. As a result, 120 parts by mass of an aqueous solution of 5 percent by mass diacetone acrylamide-modified polyvinylalcohol was obtained. The thus-manufactured preparation liquid was referred to as coating liquid 1.

Coating of Coating Liquid 1 to Surface of Base Particle

Using a coating device (MP-01, manufactured by POWREX CORPORATION) available on market, 100 parts by mass of powder of stainless steel (SUS316L, volume average particle diameter: 41 μm, manufactured by Sanyo Special Steel Co., Ltd.) serving as a base particle was coated with the coating liquid 1 under the following coating conditions in such a manner that the coverage thickness was 200 nm to obtain a powder 1 for 3D modeling having a volume average particle diameter of 43 μm (evaluation device: Microtrac HRA, manufactured by NIKKISO CO., LTD.). The coverage thickness was measured as follows:

Coverage Thickness

A sample for observation was prepared by polishing the surface of the powder 1 for 3D modeling by emery paper and thereafter slightly polishing the surface with a wet cloth to dissolve the resin portion. Next, the border between the base portion and the resin portion exposed to the surface was observed by a field-emission-type scanning electron microscope (FE-SEM) and the length between the surface of the resin portion and the border was measured as the coverage thickness. Thereafter, the average of ten measured points was obtained as the coverage thickness (average thickness).

Coating Conditions

Spray setting

Nozzle type: 970

Nozzle diameter: 1.2 mm

Coating liquid discharging pressure: 4.7 Pa·s

Coating liquid discharging speed: 3 g/min.

Amount of atomized air: 50 NL/min

Rotor setting

Rotor type: M-1

Rotation speed: 60 rpm

Number of rotation: 400 percent

Air stream setting

Air supply temperature: 80 degrees C.

Air supply amount: 0.8 $m^3$/min.

Bug filter shaking pressure: 0.2 MPa

Bug filter shaking time 0.3 seconds

Bug filter interval: 5 seconds

Coating time: 80 minutes

Preparation of Solution 1

70 parts of water and 30 parts of 3-methyl-1,3-butane diol (manufactured by Tokyo Chemical Industry Co. Ltd.) serving as a fluidity adjusting agent were mixed and stirred to obtain a solution 1.

Example 1

A 3D object 1 was manufactured in the following manner by using the powder 1 for 3D modeling, the solution 1, and a form print pattern of the size (70 mm long×12 mm wide).

1. Using a known powder layer forming device as illustrated as in FIG. 1, the powder 1 for 3D modeling was transferred from the powder storage tank on the supplying side to the powder storage tank on the 3D modeling side and a thin layer of the powder 1 for 3D modeling having an average thickness of 100 μm was formed on a substrate.

2. Next, the solution 1 was imparted (discharged) from the nozzles of a known inkjet discharging head to the surface of the thus-formed thin layer of the powder 1 for 3D modeling to dissolve diacetone acrylamide-modified polyvinylalcohol in the water contained in the solution 1, thereby causing the base particles to adhere to each other.

3. Thereafter, repeating the steps 1 and 2, the thin layer of the powder 1 for 3D modeling was sequentially laminated to obtain a laminated 3D object having an average thickness of 3 mm. Thereafter, using a drier, the 3D object was dried at 50 degrees C. for four hours and thereafter 100 degrees C. for 12 hours to obtain a 3D object 1.

Losing shape did not occur to the thus-obtained 3D object 1 when extra powder for 3D modeling was removed by air blow.

The bend stress of the 3D object 1 was measured in the following manner. These results are shown in Table 2.

Bend Stress

Three-point bend stress of the 3D object 1 was measured to obtain the bend stress (intensity) thereof using a device (Autograph AGS-J, manufactured by Shimadzu Corporation) to measure intensity (hardness) and a three-point bend test jig (plastic). The bend stress was evaluated according to the following criteria.

Evaluation Criteria

A: 8.0 MPa or more

B: 5.0 MPa to less than 8.0 MPa

C: 3.0 MPa to less than 5.0 MPa

D: Less than 3.0 MPa

4. The 3D object 1 obtained in the step 3 described above was heated to 500 degrees C. in 3 hours and 58 minutes in a nitrogen atmosphere using a drier. After keeping the temperature at 400 degrees C. for 4 hours, the 3D object 1 was cooled down to 30 degrees C. in four hours to conduct degreasing followed by sintering at 1,400 degrees C. in a sintering furnace in vacuum condition. As a result, a 3D object (sintered object) 1 having a beautiful surface was obtained.

This sintered object was a completely integrated stainless structure (metal lump) and not broken at all when slammed down on a hard floor.

Example 2

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the bend stress of the obtained 3D object was measured in the same manner as in Example 1. The results are shown in Table 2.

Example 3

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-17, average polymerization degree: 1,700, manufactured by JAPAN VAM & POVAL CO., LTD.), and the bend stress of the obtained 3D object was measured in the same manner as in Example 1. The results are shown in Table 2.

Example 4

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-20, average polymerization degree: 2,000, manufactured by JAPAN VAM & POVAL CO., LTD.), and the bend stress of the obtained 3D object was measured in the same manner as in Example 1. The results are shown in Table 2.

Example 5

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the powder of stainless steel (SUS316L, volume average particle diameter: 41 μm, manufactured by Sanyo Special Steel Co., Ltd.) serving as base particle was changed to silica particles (EXCELICA SE-15K, volume average particle diameter: 24 μm, manufactured by Tokuyama Corporation), and the bend stress of the obtained 3D object was measured in the same manner as in Example 1. The results are shown in Table 2.

Example 6

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the powder of stainless steel (SUS316L, volume average particle diameter: 41 μm, manufactured by Sanyo Special Steel Co., Ltd.) serving as base particle was changed to alumina particles (TAIMICRON TM-5D, volume average particle diameter: 0.3 μm, manufactured by TAIMEI CHEMICALS Co., Ltd.), and the bend stress of the obtained 3D object was measured in the same manner as in Example 1. The results are shown in Table 2.

Example 7

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the solution 1 was changed to the solution 2 prepared in the following "Preparation of Solution 2", and the bend stress of the obtained 3D object was measured in the same manner as in Example 1. The results are shown in Table 2.

Preparation of Solution 2

0.1 parts by mass of an ammonium salt of zirconium carbonate (AC20, manufactured by DAIICHI KIGENSO KAGAKU KOGYO CO., LTD.) as cross-linking agent was added to and mixed and stirred with 70 parts of water and 30 parts of 3-methyl-1,3-butane diol (manufactured by Tokyo Chemical Industry Co. Ltd.) serving as a fluidity adjusting agent to prepare a solution 2.

Example 8

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the solution 1 was changed to the solution 3 prepared in the following "Preparation of Solution 3", and the bend stress of the obtained 3D object was measured in the same manner as in Example 1.

The results are shown in Table 2.

Preparation of Solution 3

0.1 parts by mass of an ester of glyoxylic acid (Safelink SPM-02, manufactured by The Nippon Synthetic Chemical Industry Co., Ltd.) as cross-linking agent was added to and mixed and stirred with 70 parts of water and 30 parts of 3-methyl-1,3-butane diol (manufactured by Tokyo Chemical Industry Co. Ltd.) serving as fluidity adjusting agent to prepare a solution 3.

Example 9

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the solution 1 was changed to the solution 4 prepared in the following "Preparation of Solution 4", and the bend stress of the obtained 3D object was measured in the same manner as in Example 1. The results are shown in Table 2

Preparation of Solution 4

0.1 parts by mass of adipic acid dihydrazide (ADH, manufactured by JAPAN FINECHEM COMPANY, INC.) as cross-linking agent was added to and mixed and stirred with 70 parts of water and 30 parts of 3-methyl-1,3-butane diol (manufactured by Tokyo Chemical Industry Co. Ltd.) serving as fluidity adjusting agent to prepare a solution 4.

Example 10

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to a copolymer of diacetone acrylamide-acrylic (Plascize L-6466, manufactured by GOO CHEMICAL CO., LTD.) and the bend stress of the obtained 3D object was measured in the same manner as in Example 1.

The results are shown in Table 2.

Example 11

A 3D object was manufactured in the same manner as in Example 7 except that diacetone acrylamide-modified polyvinylalcohol (DF-03, average polymerization degree: 300, manufactured by JAPAN VAM & POVAL CO., LTD.) was changed to a copolymer of diacetone acrylamide-acrylic (Plascize L-6466, manufactured by GOO CHEMICAL CO., LTD.) and the bend stress of the obtained 3D object was measured in the same manner as in Example 1.

The results are shown in Table 2.

Example 12

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the coating time was adjusted to 2 minutes, and the bend stress of the obtained 3D object was measured in the same manner as in Example 1.

The results are shown in Table 2.

Example 13

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the coating time was adjusted to 40 minutes, and the bend stress of the obtained 3D object was measured in the same manner as in Example 1.

The results are shown in Table 2.

Example 14

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the coating time was adjusted to 200 minutes, and the bend stress of the obtained 3D object was measured in the same manner as in Example 1.

The results are shown in Table 2.

Example 15

A powder for 3D modeling was prepared in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the base material was changed to stainless steel {SUS316L (PSS316L-10μ, volume average particle diameter: 9 μm, manufactured by Sanyo Special Steel Co., Ltd.)}. Thereafter, the powder was classified by a sonic wave screen shaker (SW-20A, manufactured by TSUTSUI SCIENTIFIC INSTRUMENTS CO., LTD.) to collect powder that had passed through the opening of 5 μm φ of the screen. The collected powder was defined as the powder 11 for 3D modeling. Using the thus-obtained powder 11 for 3D modeling, a 3D object was manufactured in the same manner as in Example 1 and the bend stress thereof was measured in the same manner as in Example 1.

The results are shown in Table 2.

Example 16

A powder for 3D modeling was prepared in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the base material was changed to stainless steel {SUS316L (PSS316L-10μ, volume average particle diameter: 9 μm, manufactured by Sanyo Special Steel Co., Ltd.)}. Thereafter, the powder was classified by a sonic wave screen shaker (SW-20A, manufactured by TSUTSUI SCIENTIFIC INSTRUMENTS CO., LTD.) to collect powder that had passed through the opening of 10 μm φ of the screen. The collected powder was defined as the powder 12 for 3D modeling. Using the thus-obtained powder 12 for 3D modeling, a 3D object was manufactured in the same manner as in Example 1 and the bend stress thereof was measured in the same manner as in Example 1.

The results are shown in Table 2.

Example 17

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the base material was changed to stainless steel {SUS316L (PSS316L-10μ, volume average particle diameter: 9 μm, manufactured by Sanyo Special Steel Co., Ltd.)}, and the bend stress of the the obtained 3D object was measured in the same manner as in Example 1.

The results are shown in Table 2.

Example 18

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the base material was changed to stainless steel (SUS316L-20μ, volume average particle diameter: 15 μm, manufactured by Sanyo Special Steel Co., Ltd.), and the bend stress of the obtained 3D object was measured in the same manner as in Example 1.

The results are shown in Table 2.

Example 19

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the base material was changed to stainless steel (SUS316L-105μ/+53μ, volume average particle diameter: 80 μm, manufactured by Sanyo Special Steel Co., Ltd.), and the bend stress of the obtained 3D object was measured in the same manner as in Example 1.

The results are shown in Table 2.

Example 20

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to diacetone acrylamide-modified polyvinylalcohol (DF-05, average polymerization degree: 500, manufactured by JAPAN VAM & POVAL CO., LTD.) and the base material was changed to stainless steel (SUS316L-210μ/+63μ, volume average particle diameter: 140 μm, manufactured by Sanyo Special Steel Co., Ltd.), and the bend stress of the obtained 3D object was measured in the same manner as in Example 1.

The results are shown in Table 2.

Comparative Example 1

A 3D object was manufactured in the same manner as in Example 1 except that diacetone acrylamide-modified polyvinylalcohol (DF-03, average polymerization degree: 300, manufactured by JAPAN VAM & POVAL CO., LTD.) was changed to completely-saponified polyvinylalcohol (KL105, average polymerization degree: 500, manufactured by KURARAY CO., LTD.) and the bend stress of the obtained 3D object was measured in the same manner as in Example 1.

The results are shown in Table 2.

Comparative Example 2

A 3D object was manufactured in the same manner as in Comparative Example 1 except that the powder of stainless steel {SUS316L (PSS316L), volume average particle diameter: 41 μm, manufactured by Sanyo Special Steel Co., Ltd.} serving as base particle was changed to silica particles (EXCELICA SE-15K, volume average particle diameter: 24 μm, manufactured by Tokuyama Corporation), and the bend stress of the obtained 3D object was measured in the same manner as in Example 1.

The results are shown in Table 2.

Comparative Example 3

A 3D object was manufactured in the same manner as in Comparative Example 1 except that the powder of stainless steel {SUS316L (PSS316L), volume average particle diameter: 41 μm, manufactured by Sanyo Special Steel Co., Ltd.} serving as a base particle was changed to alumina particles (TAIMICRON TM-5D, volume average particle diameter: 0.3 μm, manufactured by TAIMEI CHEMICALS Co., Ltd.), and the bend stress of the obtained 3D object was measured in the same manner as in Example 1.

The results are shown in Table 2.

TABLE 1

| | | | Powder for 3D modeling | |
| | | | Base particle | |
| | No. | No. | Article | Product |
|---|---|---|---|---|
| Example 1 | 1 | 1 | SUS316L | PSS316L |
| Example 2 | 2 | 1 | SUS316L | PSS316L |
| Example 3 | 3 | 1 | SUS316L | PSS316L |
| Example 4 | 4 | 1 | SUS316L | PSS316L |
| Example 5 | 5 | 2 | Silica | EXCELICA SE-15K |
| Example 6 | 6 | 3 | Alumina | TAIMICRON TM-5D |
| Example 7 | 5 | 1 | SUS316L | PSS316L |
| Example 8 | 5 | 1 | SUS316L | PSS316L |
| Example 9 | 5 | 1 | SUS316L | PSS316L |
| Example 10 | 7 | 1 | SUS316L | PSS316L |
| Example 11 | 7 | 1 | SUS316L | PSS316L |
| Example 12 | 8 | 1 | SUS316L | PSS316L |
| Example 13 | 9 | 1 | SUS316L | PSS316L |
| Example 14 | 10 | 1 | SUS316L | PSS316L |
| Example 15 | 11 | 4 | SUS316L | PSS316L (−10 μm) |
| Example 16 | 12 | 4 | SUS316L | PSS316L (−10 μm) |
| Example 17 | 13 | 4 | SUS316L | PSS316L (−10 μm) |
| Example 18 | 14 | 5 | SUS316L | PSS316L (−20 μm) |
| Example 19 | 15 | 6 | SUS316L | PSS316L (−105 μm/+53 μm) |
| Example 20 | 16 | 7 | SUS316L | PSS316L (−210 μm/+63 μm) |
| Comparative Example 1 | 17 | 1 | SUS316L | PSS316L |
| Comparative Example 2 | 18 | 2 | Silica | EXCELICA SE-15K |
| Comparative Example 3 | 19 | 3 | Alumina | TAIMICRON TM-5D |

| | | | Powder for 3D modeling | | |
| | | | Resin | | |
| | No. | No. | Article | Product | Average polymerization degree |
|---|---|---|---|---|---|
| Example 1 | 1 | 1 | Diacetone acrylamide-modified polyvinylalcohol | DF-03 | 300 |
| Example 2 | 2 | 2 | Diacetone acrylamide-modified polyvinylalcohol | DF-05 | 500 |
| Example 3 | 3 | 3 | Diacetone acrylamide-modified polyvinylalcohol | DF-17 | 1700 |
| Example 4 | 4 | 4 | Diacetone acrylamide-modified polyvinylalcohol | DF-20 | 2000 |

TABLE 1-continued

| | | | | | |
|---|---|---|---|---|---|
| Example 5 | 5 | 2 | Diacetone acrylamide-modified polyvinylalcohol | DF-05 | 500 |
| Example 6 | 6 | 2 | Diacetone acrylamide-modified polyvinylalcohol | DF-05 | 500 |
| Example 7 | 5 | 2 | Diacetone acrylamide-modified polyvinylalcohol | DF-05 | 500 |
| Example 8 | 5 | 2 | Diacetone acrylamide-modified polyvinylalcohol | DF-05 | 500 |
| Example 9 | 5 | 2 | Diacetone acrylamide-modified polyvinylalcohol | L-6466 | — |
| Example 10 | 7 | 5 | Diacetone acrylamide-modified polyvinylalcohol | L-6466 | — |
| Example 11 | 7 | 5 | Diacetone acrylamide-modified polyvinylalcohol | DF-05 | 500 |
| Example 12 | 8 | 2 | Diacetone acrylamide-modified polyvinylalcohol | DF-05 | 500 |
| Example 13 | 9 | 2 | Diacetone acrylamide-modified polyvinylalcohol | DF-05 | 500 |
| Example 14 | 10 | 2 | Diacetone acrylamide-modified polyvinylalcohol | DF-05 | 500 |
| Example 15 | 11 | 2 | Diacetone acrylamide-modified polyvinylalcohol | DF-05 | 500 |
| Example 16 | 12 | 2 | Diacetone acrylamide-modified polyvinylalcohol | DF-05 | 500 |
| Example 17 | 13 | 2 | Diacetone acrylamide-modified polyvinylalcohol | DF-05 | 500 |
| Example 18 | 14 | 2 | Diacetone acrylamide-modified polyvinylalcohol | DF-05 | 500 |
| Example 19 | 15 | 2 | Diacetone acrylamide-modified polyvinylalcohol | DF-05 | 500 |
| Example 20 | 16 | 2 | Diacetone acrylamide-modified polyvinylalcohol | DF-05 | 500 |
| Comparative Example 1 | 17 | 6 | Non-modified polyvinylalcohol (completely-saponified polyvinylalcohol) | KL105 | 500 |
| Comparative Example 2 | 18 | 6 | Non-modified polyvinylalcohol (completely-saponified polyvinylalcohol) | KL105 | 500 |
| Comparative Example 3 | 19 | 6 | Non-modified polyvinylalcohol (completely-saponified polyvinylalcohol) | KL105 | 500 |

TABLE 2

| | Powder for 3D modeling | | Solution | | Bend stress | |
|---|---|---|---|---|---|---|
| | Coverage thickness (nm) | Volume average particle diameter (μm) | No. | Crosslinking agent | Product | Measured value (MPa) | Evaluation |
| Example 1 | 200 | 43 | 1 | — | — | 5.0 | B |
| Example 2 | 200 | 43 | 1 | — | — | 6.3 | B |
| Example 3 | 200 | 48 | 1 | — | — | 6.4 | B |
| Example 4 | 200 | 80 | 1 | — | — | 6.0 | B |
| Example 5 | 200 | 53 | 1 | — | — | 4.0 | C |
| Example 6 | 200 | 30 | 1 | — | — | 3.8 | C |
| Example 7 | 200 | 43 | 2 | Ammonium salt of zirconium carbonate | AC20 | 9.0 | A |
| Example 8 | 200 | 43 | 3 | Ester of glyoxylic acid | SPM02 | 7.5 | B |
| Example 9 | 200 | 43 | 4 | Adipic acid dihydrazide | ADH | 6.8 | B |
| Example 10 | 200 | 43 | 1 | — | — | 4.5 | C |
| Example 11 | 200 | 43 | 2 | Ammonium salt of zirconium carbonate | AC20 | 6.0 | B |
| Example 12 | 5 | 43 | 1 | — | — | 4.5 | C |
| Example 13 | 100 | 43 | 1 | — | — | 5.8 | B |
| Example 14 | 500 | 43 | 1 | — | — | 8.2 | A |
| Example 15 | 200 | 3 | 1 | — | — | 7.0 | B |

TABLE 2-continued

| | Powder for 3D modeling | | Solution | | Bend stress | |
|---|---|---|---|---|---|---|
| | Coverage thickness (nm) | Volume average particle diameter (μm) | No. | Crosslinking agent | Product | Measured value (MPa) | Evaluation |
| Example 16 | 200 | 5 | 1 | — | — | 6.9 | B |
| Example 17 | 200 | 10 | 1 | — | — | 6.8 | B |
| Example 18 | 200 | 15 | 1 | — | — | 6.5 | B |
| Example 19 | 200 | 85 | 1 | — | — | 6.0 | B |
| Example 20 | 200 | 140 | 1 | — | — | 5.8 | B |
| Comparative Example 1 | 200 | 43 | 1 | — | — | 1.5 | D |
| Comparative Example 2 | 200 | 52 | 1 | — | — | 0.5 | D |
| Comparative Example 3 | 200 | 40 | 1 | — | — | 1.3 | D |

Embodiments of the present disclosure are, for example, as follows.

1 A powder for 3D modeling includes a base particle and a resin having a functional group represented by the following Chemical formula 1.

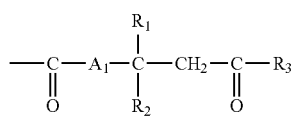

Chemical formula 1

In the Chemical formula 1, $A_1$ represents O or NH, and $R_1$, $R_2$, and $R_3$ each, independently represent $CH_3$, $C_2H_5$, $C_3H_7$, or $C_4H_9$. The base particle is covered with the resin.

2. The powder for 3D modeling according to 1 mentioned above, wherein the resin is a water soluble resin.

3. The powder for 3D modeling according to 1 or 2 mentioned above, wherein the resin is polyvinyl alcohol.

4. The powder for 3D modeling according to any one of 1 to 3 mentioned above, wherein the resin is diacetone acrylamide-modified polyvinyl alcohol.

5. The powder for according to any one of 1 to 4 mentioned above, wherein the resin has an average polymerization degree of from 500 to 1,700.

6. A set for 3D modeling includes the powder for 3D modeling of any one of 1 to 5 and a solution containing a solvent that dissolves the resin.

7. The set for 3D modeling according to 6 mentioned above, wherein the solution includes a compound that conducts cross-linking reaction with the functional group represented by the Chemical formula 1.

8. The set for 3D modeling according to 6 or 7 mentioned above, wherein the resin is a water soluble resin and the solvent includes water.

9. A method of manufacturing a 3D object includes forming a powder layer for the 3D object on a substrate using the powder of any one of 1 to 5 mentioned above, curing an area of the powder layer for 3D modeling by imparting a solution containing a solvent that dissolves the resin to the area, and repeating the step of the forming and the step of curing.

10. The method of manufacturing a 3D object according to 9 mentioned above, wherein the step of imparting is conducted by an inkjet discharging method.

11. A device for manufacturing a 3D object includes a powder layer forming device to form a layer of the powder for 3D modeling of any one of 1 to 5 mentioned above on a substrate, and a solution imparting device to impart a solution containing a solvent that dissolves the resin to cure an area of the layer.

According to the present disclosure, a 3D object having a complicated form and a sufficient strength with a high level of safety and good dimension accuracy can be simply and efficiently manufactured without losing shape before sintering, etc.

Having now fully described embodiments of the present invention, it will be apparent to one of ordinary skill in the art that many changes and modifications can be made thereto without departing from the spirit and scope of embodiments of the invention as set forth herein.

What is claimed is:

1. A powder for 3D modeling comprising:
   a base particle; and
   a resin having a functional group represented by the following Chemical formula 1,

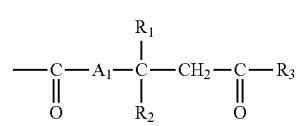

Chemical formula 1 where $A_1$ represents O or NH and $R_1$, $R_2$, and $R_3$ each, independently represent $CH_3$, $C_2H_5$, $C_3H_7$, or $C_4H_9$, wherein the base particle is covered with the resin.

2. The powder according to claim 1, wherein the resin comprises a water soluble resin.

3. The powder according to claim 1, wherein the resin comprises polyvinyl alcohol.

4. The powder according to claim 1, wherein the resin comprises diacetone acrylamide-modified polyvinyl alcohol.

5. The powder according to claim 1, wherein the resin has an average polymerization degree of from 500 to 1,700.

6. A set for 3D modeling comprising:
a powder comprising a base particle and a resin having a functional group represented by the following Chemical formula 1,

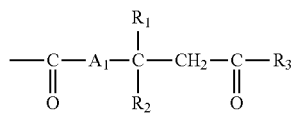

Chemical formula 1 where $A_1$ represents O or NH and $R_1$, $R_2$, and $R_3$ each, independently represent $CH_3$, $C_2H_5$, $C_3H_7$, or $C_4H_9$; and
a solution comprising a solvent that dissolves the resin, wherein the base particle is covered with the resin.

7. The set for 3D modeling according to claim 6, wherein the solution comprises a compound that conducts cross-linking reaction with the functional group represented by the Chemical formula 1.

8. The set for 3D modeling according to claim 6, wherein the resin comprises a water soluble resin and the solvent comprises water.

9. A method of manufacturing a 3D object comprising:
forming a powder layer for 3D modeling on a substrate using the powder of claim 1;
curing an area of the powder layer for 3D modeling by imparting a solution containing a solvent that dissolves the resin to the area; and
repeating the step of the forming and the step of curing.

10. The method of manufacturing a 3D object according to claim 9, wherein the step of imparting is conducted by an inkjet discharging method.

11. A device for manufacturing a 3D object comprising:
a powder layer forming device to form a layer of the powder for 3D modeling of claim 1 on a substrate; and
a solution imparting device to impart a solution comprising a solvent that dissolves the resin to cure an area of the layer.

* * * * *